US008465206B2

(12) United States Patent
Kondo et al.

(10) Patent No.: US 8,465,206 B2
(45) Date of Patent: Jun. 18, 2013

(54) LINEAR MOTION GUIDE UNIT

(75) Inventors: Masatoshi Kondo, Gifu-ken (JP); Hideki Kuwabara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/191,755

(22) Filed: Jul. 27, 2011

(65) Prior Publication Data

US 2012/0051676 A1 Mar. 1, 2012

(30) Foreign Application Priority Data

Aug. 27, 2010 (JP) ................................ 2010-190719

(51) Int. Cl.
*F16C 29/06* (2006.01)

(52) U.S. Cl.
USPC ........................................................... 384/45

(58) Field of Classification Search
USPC ..... 384/43–45, 49, 50, 55; 74/424.82–424.88
See application file for complete search history.

(56) References Cited

U.S. PATENT DOCUMENTS 5,303,607 A * 4/1994 Katahira .................... 74/424.87
7,762,722 B2 * 7/2010 Kuwabara et al. .............. 384/44
2002/0114544 A1 * 8/2002 Matsui et al. .................. 384/45
2002/0141667 A1 * 10/2002 Ishihara .......................... 384/45
2003/0053724 A1 * 3/2003 Matsui et al. .................. 384/45
2006/0029307 A1 * 2/2006 Fujimura et al. ................ 384/45
2009/0016654 A1 * 1/2009 Kakei ............................. 384/44
2011/0033141 A1 * 2/2011 Chen et al. ...................... 384/45

FOREIGN PATENT DOCUMENTS

JP 3174232 B2 6/2001
JP 2003-90338 A 3/2003

OTHER PUBLICATIONS

Machine Translation of JP 08-130849 submitted in IDS.*

* cited by examiner

*Primary Examiner* — Alan Waits
(74) *Attorney, Agent, or Firm* — Browdy and Neimark, PLLC

(57) ABSTRACT

In a slider of a linear motion guide unit, a carriage in the slider is cut away at undersides thereof to form concaves in which tubular members defining return passages therein are placed. This is in favor of reduced machining cost. The slider is composed of the carriage having an upper portion and side bulges, end caps secured on ends of the carriage, and tubular members installed closely outside the bulges of the carriage in the sliding direction. Sidewise underparts of the carriage is cut away to provide the concaves into which the tubular members fit with tube ends being kept in spigots which communicate with turnaround passages in the end caps.

7 Claims, 7 Drawing Sheets

41
13
45
4
29
25
18
44
43
28
25
18
48
36
37
8
7
5
21
16
3
6
15
42
50
34
33
35
19
26
13
41

41
13
45
41
29
39
44
4
48
38
43
28
40
39
7
19
8
50
5
21
16
6
15
26
3
26
42
6
29
50
7
28
38
4
43
13
19
41
45
44
41

LINEAR MOTION GUIDE UNIT

FIELD OF THE INVENTION

The present invention relates to a linear motion guide unit comprised of an elongated guide rail and a slider designed to move on the elongated guide rail relatively to the guide rail by virtue of a plurality of rolling elements.

BACKGROUND OF THE INVENTION

Linear motion guide units have been extensively applied in recent years between tow parts which slide relative to each other for linear reciprocating mechanism used in increased industrial fields including semiconductor fabricating equipment, machine tools, industrial robots, and so on. Most prior linear motion guide units have been ordinarily fed with lubricant every a preselected interval through any oiling port to ensure smooth lubrication for the rolling elements throughout a closed or looped circuit. Recently advanced machines and instruments, however, are increasingly wanted energy saving, simple construction and less production cost, and further in need of making them virtually maintenance-free from many aspects of keeping running cost and maintenance cost of equipment reasonably less than ever. Correspondingly, the linear motion guide units incorporated in the advanced machinery are also challenged to keep down the consumption of lubricant to a minimum, along with realizing virtual maintenance-free operation where lubricant resupply is less needed over long-lasting operation.

In Japanese Laid-Open Patent Application No. 2003-090338 which is a commonly-assigned senior application, there is described an example of the linear motion guide unit in which a turnaround passage is constructed to help smooth running of the rolling elements and application of lubricant around the rolling elements is done at the turnaround passage over a prolonged period to make sure of improved durability. The prior linear motion guide unit, as shown in FIG. 9, is constituted with a guide rail 1P having raceway grooves 4P on longitudinal sides thereof, one to each side, and a slider 2P which fits over or conforms to the guide rail 1P to move back and forth along the guide rail 1P. The slider 2P is composed of a carriage 10P having raceway grooves 14P cut to extend in opposition to the raceway grooves 4P on the guide rail 1P, end caps 11P fastened to lengthwise opposite ends of the carriage 10P, one to each end, and end seals 13P secured on outside surfaces of the end caps 11P. A plurality of balls 20P serving as rolling element is built in a closed or looped circuit made up of a load-carrying raceway 21P defined between the raceway grooves 4P and 14P, turnaround passages provided in the end caps 11P and a return passage 22P made in the carriage 10P. The return passage 22P in the carriage 10P is constituted with a lengthwise through-hole defined inside a return passage member 6P of sintered resinous material of porous texture, which fits into a fore-and-aft bore 5P made in the carriage 10P. The return passage 22P defined inside the return passage member 6P is connected with the turnaround passage through a spigot joint formed in the end cap 11P.

Another Japanese Laid-Open Patent Application No. H08-130849, now matured into JP patent No. 3 174 232, discloses an actuator comprised of a guide track having a pair of longitudinal side walls spaced sidewise away from each other and a slider that fits into the guide track to move inside the guide track in longitudinal direction. With the prior actuator, the slider has a pair of raceway grooves lying sidewise spaced away from each other to provide load-carrying races to allow rolling elements running through there. The slider has another pair of deep grooves lying between the raceway grooves extending lengthwise in parallel with the raceway grooves. Tubular members loosely fit into the deep grooves to leave small clearances around the tubular members. The tubular members each are made of seamless tubes of wear proof stainless steel and has an overall length beyond the deep groove by a preselected dimension. The tubular members are kept in place by engagement at their opposite ends thereof with a pair of sockets on end caps or return caps.

With the linear motion guide unit disclosed in the former patent literature, meanwhile, the return passage member 6P to define the return passage 22P in the carriage 10P of the slider 2P, as shown in FIG. 9, is connected to the turnaround passage through the spigot joint to make sure of smooth transfer of the rolling elements between the turnaround passage and the return passage. The return passage member 6P is made of a sintered resinous material of porous or continuous-cellular texture to make certain of steady and sustainable application of lubricant around balls 20P over a long-lasting period with improving durability. However, the prior construction in which the return passage 22P was buried or inserted into the carriage 10P of the slider 2P had need of drilling or boring the lengthwise through-hole 5P in the carriage 10P and further inserting carefully the return passage member 6P into the through-hole 5P to finish the return passage 22P. This means the drilling or boring operation to the carriage 10P wants high precision with difficulties and high working cost.

With the actuator disclosed in the latter patent literature, moreover, the guide track has a pair of longitudinal side walls spaced sidewise away from each other and the slider fits into the guide track to move inside the guide track. The slider has a pair of deep grooves underneath to accommodate the tubular members therein, one to each recess. The end caps have sockets which are made somewhat larger than the tubular members to fit snugly over the ends of the tubular members to finish the opposite ends of the return passages. With the actuator having the slider in which the tubular members are installed as stated in the latter patent literature to prepare the closed or looped circuit for the rolling elements, namely, it was necessary to bore or deep cut the slider to install the tubular members into the slider. This involves a problem of high working costs. Moreover, the joint construction that the tubular members fit into the end caps is apt to cause a specific difficulty in which any gap or difference might come at mating surfaces between the tubular members and the end caps. Meanwhile, the rolling elements turning around in the end caps in general experience a large centrifugal force or inertial force when especially transferring from a curved area in the turnaround passage to a straight area in the closed circuit. This poses a serious challenge that the rolling elements get caught or huddled together to render the sliding performance worse. In addition, other challenges might be caused in which the rolling elements after having hit against the gap or difference raised excessive wear on either of the tubular members and the end caps, and the rolling elements after having rolled with staggers huddled together, thereby worsening the sliding condition of the slider.

SUMMARY OF THE INVENTION

The present invention has for its primary object to overcome the major challenges as stated earlier, and to provide a linear motion guide unit adapted to be used between tow parts which slide relative to each other for linear reciprocating mechanism built in semiconductor fabricating equipment, machine tools, industrial robots, and so on. More particularly, the present invention is envisaged rendering machining process on a carriage of the slider easier or simpler to make machining costs less for the sake of cost reduction for manufacturing the entire linear motion guide unit. To this end, the present invention provides a linear motion guide unit in which return passages for more than one ball serving as the rolling element isn't through-holes made in sidewise opposed bulges of the carriage, but rather tubular members that fit over spigots raised above turnaround passages in end caps to extend closely to the carriage. Moreover, when the tubular members have inside any continuous-cellular or porous compact of sintered resinous material, the present invention may provide the linear motion guide unit which is more preferable for maintenance-free lubrication over a long-lasting period and further for large freedom of design considerations to cope with a variety of desired functions with the help of different structural variations of the tubular members.

SUBJECT MATTER TO OVERCOME THE CHALLENGES

The present invention is concerned with a linear motion guide unit, comprising; an elongated guide rail having first raceway grooves extending lengthwise on sides of the guide rail, a slider that fits over or conforms to the elongated guide rail for movement in a sliding manner relatively to the guide rail, and rolling elements of balls rolling through closed or looped circuits each composed of a load-carrying raceway defined between the first raceway groove and a second raceway groove, a return passage extending in the slider direction in parallel with the load-carrying raceway and turnaround passages connecting the load-carrying passage with the return passage;

wherein the slider includes a carriage having a first upper portion and first side bulges lying on widthwise opposite sides of the upper portion to extend downward alongside of the lengthwise sides of the guide rail, end caps secured on lengthwise opposite ends of the carriage, and a pair of tubular members lying to extend closely to outsides of the first side bulges in a sliding direction to provide the return passages;

wherein the carriage is cut away inside the first bulges to form the raceway grooves and undercut at under parts of the side bulges to provide concaves extending in the sliding direction; and wherein the tubular members fit into the concaves to bring the return passages inside the tubular members into connection with the turnaround passages in the end caps.

In the present invention, a linear motion guide unit is provided in which the end caps each have a second upper portion equivalent to the first upper portion of the carriage and second side bulges equivalent to the first side bulges of the carriage, the second side bulges of the end caps having spigots raised above the end caps at areas directly exposed to the concaves on the carriage to extend out of the turnaround passages to fit into tube ends of the tubular members to keep in place the tubular members and connect the turnaround passages with their associated return passages.

In the present invention, a linear motion guide unit is provided in which the concaves extending in the side bulges of the carriage in the sliding direction each have a semi-circular configuration in transverse section, which is adapted to make snug fit over an outside circular surface of the tubular member.

In the present invention, a linear motion guide unit is provided in which the tubular member is composed of an outer cylinder and an inner cylinder placed inside the outer cylinder, the outer cylinder being of a material selected from stainless steel, aluminum alloy, ceramics, resins and a composite reinforced with carbon fibers, and the inner cylinder being of a sintered resinous material of porous texture impregnated with lubricant. Moreover, the outer cylinder having accommodated the inner cylinder therein fits over the spigots at the tube ends thereof in such a relation that circular edges of the inner cylinder come into edge-on abutment against the circular edges of the spigots, and the inner cylinder has a radial thickness equal with that of the spigots so that the turnaround passages are smoothly connected to the return passage with causing no gap or no difference between them. In a further another aspect of the present invention, there is a slight clearance between an inside circular surface of the outer cylinder and an outside circular surface of the inner cylinder.

In the present invention a linear motion guide unit is provided in which the tubular member has a one-piece construction of a material selected from resins, resinous materials of enhanced stiffness reinforced with carbon fibers and metallic materials. Moreover, the tubular member at the tube ends thereof is larger than at a major middle of the tubular member in inside diameter to fit at the tube ends over the spigots and wherein the tubular member at the major middle is equal with the spigots in the inside diameter so as to connect the turnaround passages with the return passage with causing no gaps or differences between the passages.

In the present invention a linear motion guide unit is provided in which the return passage inside the tubular member and the turnaround passages inside the spigots are identical with each other in inside diameter so as to connect the turnaround passages with the return passage with causing no gaps or differences between the passages. Furthermore, the tubular members are placed in the concaves more inwards than lengthwise sides of the carriage.

With the linear motion guide unit constructed as stated earlier, there is no need to bore or drill a through-hole in the carriage in preparation for installation of a tubular member in the carriage. Instead, it may be sufficient only to undercut the bulges of the carriage simultaneously with machining phase on the carriage. Thus, the working process for the return passages is easy and simple with accompanying reduced machining costs. The closed or looped circuits through which the rolling elements or balls circulate may be finished easily and simply with just the placement of the tubular members in the concaves which have been made by undercutting the underparts of the first bulges. Cutting away material from the undersides of the first bulges of the carriage, moreover, makes for slim construction or weight reduction of the first bulges, which means the slider, more especially the linear motion guide unit weighs less. As an alternative to the tubular member of monolithic one-piece construction, the tubular member may be composed of an outer cylinder of metals and so on having high strength and inner cylinder accommodated inside the outer cylinder and made of a sintered resinous material of porous texture impregnated with lubricant. The alternative as stated earlier is not only easy in assembly and simple in construction, but also favorable to the enhancement of the strength of the tubular member and further maintenance-free operation for the lubrication.

BRIEF DESCRIPTION OF THE DRAWINGS

FIG. 5 is a view in different elevations showing the tubular member to be fitted into the slider of FIG. 2, in which FIG. 5(A) is a view in side elevation and FIG. 5(B) is a view in front elevation.

FIG. 6 is a view in different elevations showing a second version of the tubular member, in which FIG. 6(A) is a view in side elevation and FIG. 6(B) is a view in front elevation.

DETAILED DESCRIPTION OF THE PREFERRED EMBODIMENTS

The linear motion guide unit according to the present invention is adapted for use in any relatively sliding components in machinery as diverse as semiconductor fabricating equipment, robotic machines, machine tools, and so on to realize the relative sliding between parts or components with smoothness. Especially, the linear motion guide unit of the present invention features the return passage which is prepared separately from the carriage instead of fitted in a through-hole drilled or bored in the carriage. Preferred embodiments of the linear motion guide unit constructed according to the present invention will be described in detail by reference to the drawings.

Figure 1:
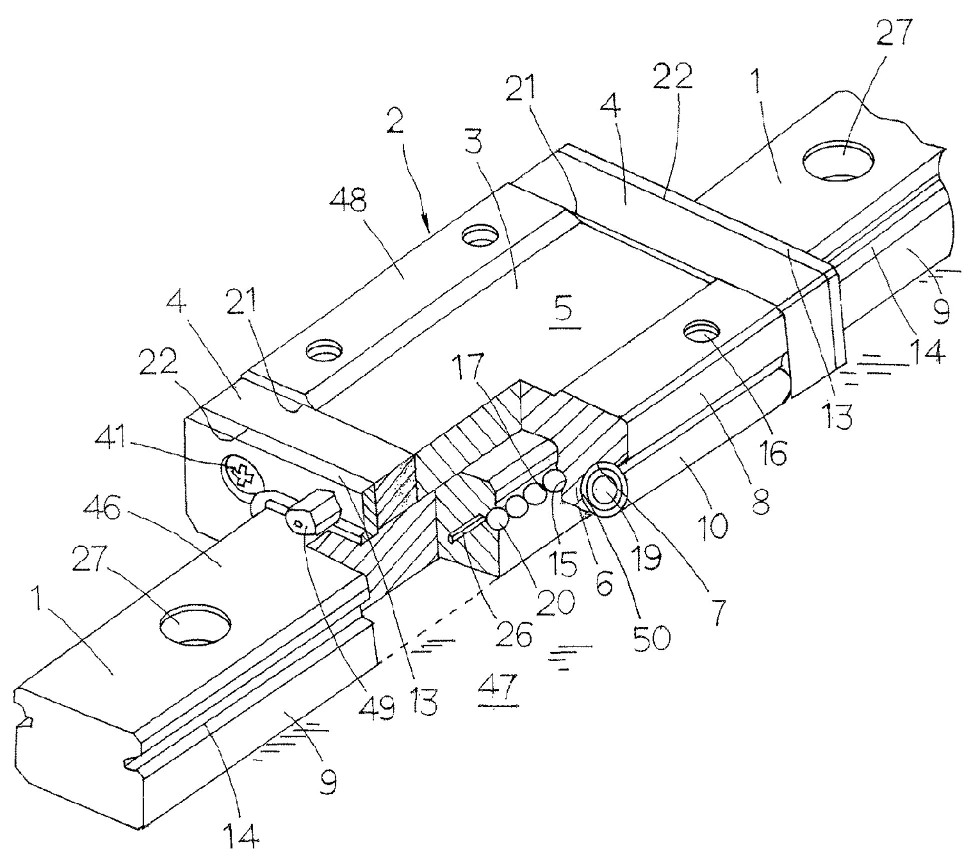
FIG. 1 is a view in perspective, partially broken away, showing a preferred embodiment of a linear motion guide unit according to the present invention.
Figure 2:
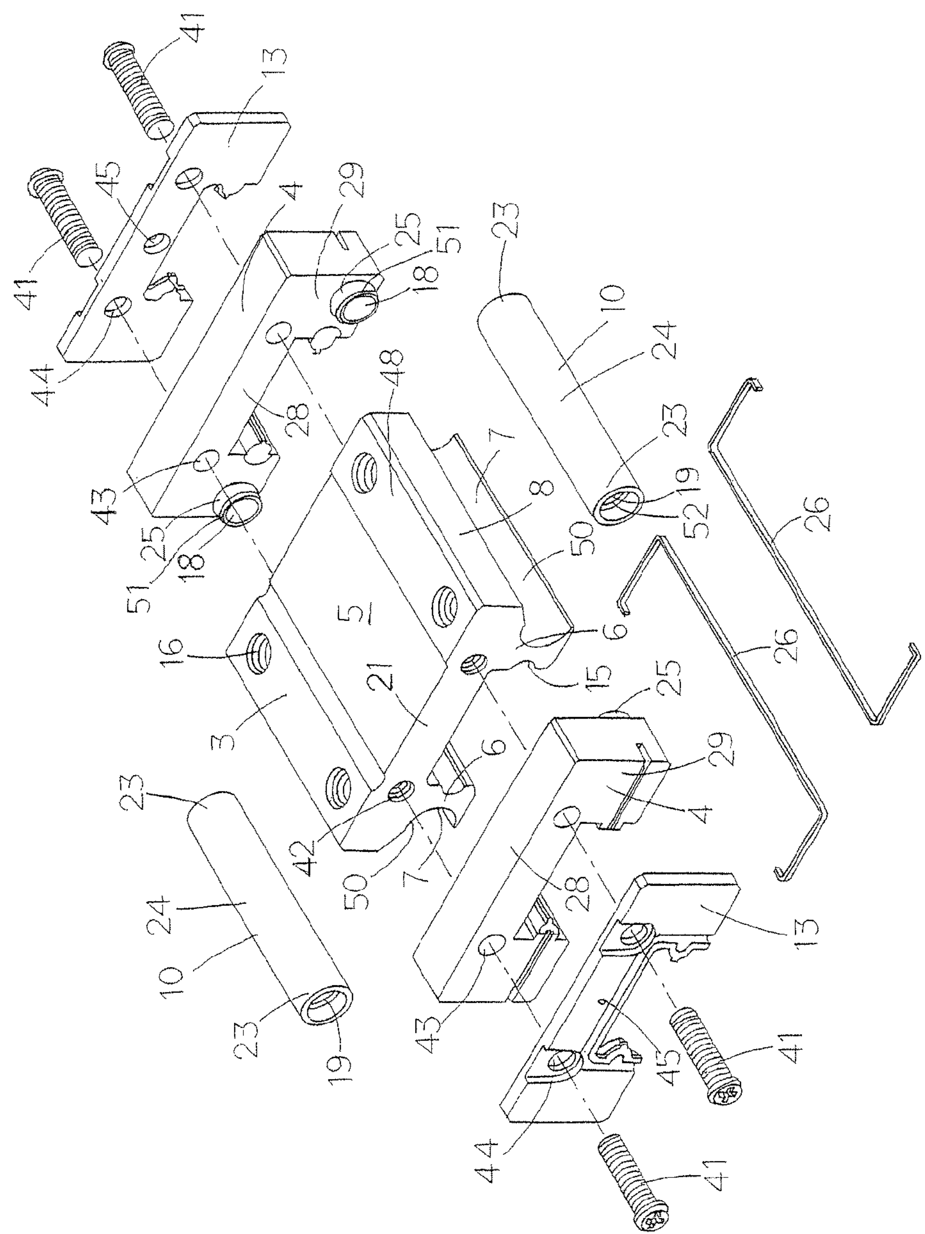
FIG. 2 is an exploded view in perspective to illustrate a first version of a slider according to the present invention.
Figure 3:
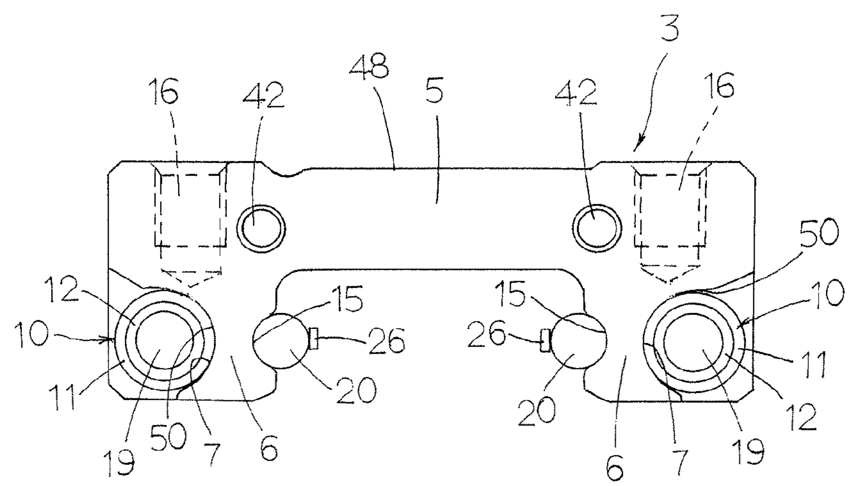
FIG. 3 is a view in front elevation of the slider of FIG. 2, but in which an end cap together with an end seal being removed to show a combination of a carriage with tubular members.
Figure 4:
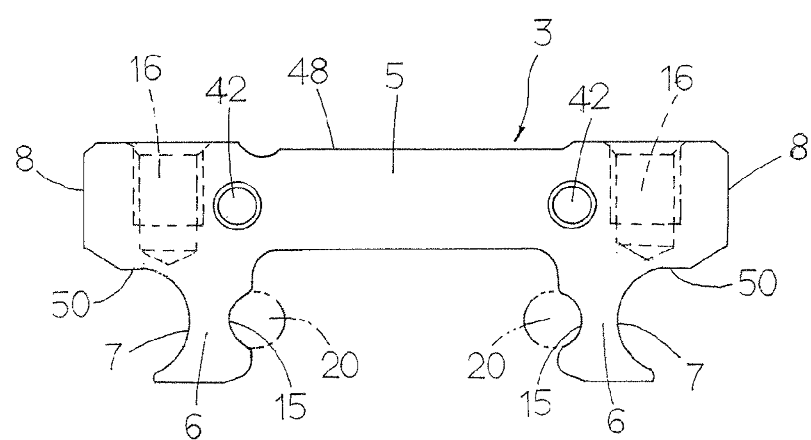
FIG. 4 is a view in front elevation of the carriage for the slider of FIG. 2.

First, the linear motion guide unit of the present invention will be explained generally with reference to FIGS. 1 and 2. The linear motion guide unit is intended to find the applications between components or members which slide relatively to each other, for example a machine bed and a table, and composed of a guide rail 1 and a slider 2 that fits over or conform to the guide rail 1 for sliding movement with respect to the guide rail 1. The guide rail 1 has raceway grooves 14, or first raceway grooves, on lengthwise sides 9 thereof, one to each side. On a top surface 46 of the guide rail 1, there are provided bolt holes 27 which are used to fasten the guide aril 1 to a base 47 such as machine bed and so on. The slider 2 designed to fit over or conform to the guide rail 1 for movement relative to the guide rail 1 has raceway grooves 15, or second raceway grooves, in opposition to the raceway grooves 14 on the guide rail 1. The slider 2 is composed of a carriage 3, end caps 4 secured on lengthwise opposite end surfaces 21 of the carriage 3 and end seals 13 mounted on outward surfaces 22 of the end caps 4 to close clearances left between the guide rail 1 and the end caps 4, all the components recited earlier being recessed to ride astride the top surface 46 of the guide rail 1. A load-carrying raceway 17 is defined between the first raceway groove 14 on the guide rail 1 and the second raceway groove 15 on the slider 2, As the slider 2 moves relatively to the guide rail 1, more than one rolling element or ball 13 rolls through the load-carrying raceway 17. Both the end cap 4 and end seal 13 are fastened to the carriage 3 with using fastening bolts 41 which are extended through holes 43, 44 across the end cap 4 and the end seal 13 and tightened into threaded holes 42 on the carriage 3. The carriage 3 having the second raceway groove 15 is provided on a top surface 46 thereof with threaded holes 16 which are used to fasten any table to the slider 2.

Rolling of the balls 20 through the load-carrying raceway 17 defined between the raceway groove 14 on the guide rail 1 and the raceway groove 15 on the carriage 3 makes possible the linear movement of the slider 2 relatively to the guide rail 1. A retainer band 26 is to keep in place the balls 20 against falling apart from the carriage 3 even after the slider 2 has been demounted from the guide rail 1. The balls 20 are allowed to roll through the closed or looped circuit in such a circulating manner first rolling into one turnaround passage 18 of one end cap 4 from the load-carrying raceway 17, transferring from the one turnaround passage 18 into a return passage 19 constructed as stated later, and then rolling into another turnaround passage 18 of another end cap 4 from the return passage 19 to go back to the load-carrying raceway 17. A grease nipple to apply lubricant or lubricating oil around the balls 20 is provided on the slider 2 in a fashion protruding from a lubricant inlet opening 45 above the outward surface of the end seal 13. Lubricant charged through the grease nipple 49 is applied around the rolls 20 through an oil path and an oil hole made in the end cap 4.

The linear motion guide unit of the present invention is mainly composed of the guide rail 1 having the first raceway grooves 14 on the lengthwise sides 3 thereof one to each side, the slider 2 having the second raceway grooves 15 in opposition to the first raceway grooves 14 on the guide rail 1, the slider 2 being designed to fit over of conform to the guide rail 1 for sliding movement relative to the guide rail 1, and a plurality of balls 20 for rolling element built in to roll through the closed circuits each of which is made up of the load-carrying raceway 17, the return passage 19 extending in the slider 2 in parallel with the load-carrying raceway 17 and the turnaround passages 18 lying in the slider 2 to connect the load-carrying raceway 17 with the return passage 19. Especially, the slider 2 is chiefly composed of the carriage 3 which is made up of an upper portion 5, or a first upper portion, and side bulges 6, or first bulges, lying on the widthwise opposite sides of the upper portion 5 to extend downward alongside of the longitudinal sides 9 of the guide rail 1, and the end caps 4 secured on lengthwise opposite ends of the carriage 3. The slider 2 further has the tubular members 10 extend closely to the outsides of the carriage 3 along a sliding direction to provide the return passages 19. The carriage 3 is cut away inside the bulges 6 to form the raceway grooves 15 and undercut at the underparts 50 outside the bulges 6 to form concaves 7 extending across the overall length of the carriage 3 in the sliding direction, correspondingly leaving overhanging portions 8 in relief. The tubular members 10 fit snugly into the concaves 7 to form the return passages 19 which communicate with the turnaround passages 18 in the end caps 4.

The tubular members 10 is placed in the concaves 7 along the undercut underparts 50 of the carriage 3 so as not to protrude sidewise out of widthwise edges of the overhanging portions 8, but to lie entirely inside the widthwise edges of the overhanging portions 8. The end caps 4 each have an upper portion 28, or a second upper portion, equivalent to the upper portion 5 of the carriage 3 and side bulges 29, or second bulges, equivalent to the side bulges 6 of the carriage 3. On the second side bulges 29 of the end cap 4, there are raised spigots 25 above the end cap 4 at areas directly exposed to the concaves 7 which are made by undercutting the undersides 50 of the carriage 3. The spigots 25 extend out of the turnaround passages 18 to fit snugly into tube ends 23 of the tubular members 10 to connect the turnaround passages 18 with their associated return passages 19. The underparts or undersides of the side bulges 6 in the carriage 3 are undercut at 50 to form the concaves 7 of semi-circular configuration in transverse section, which is adapted to make snug fit over an outside circular surface of the tubular member 10 throughout the overall length of the tubular member 10 so as not to interface with the tubular member 10 everywhere across tube ends and major middle of the tubular member 10 or so as to leave a small clearance away from the tubular member 10.

Figure 5:
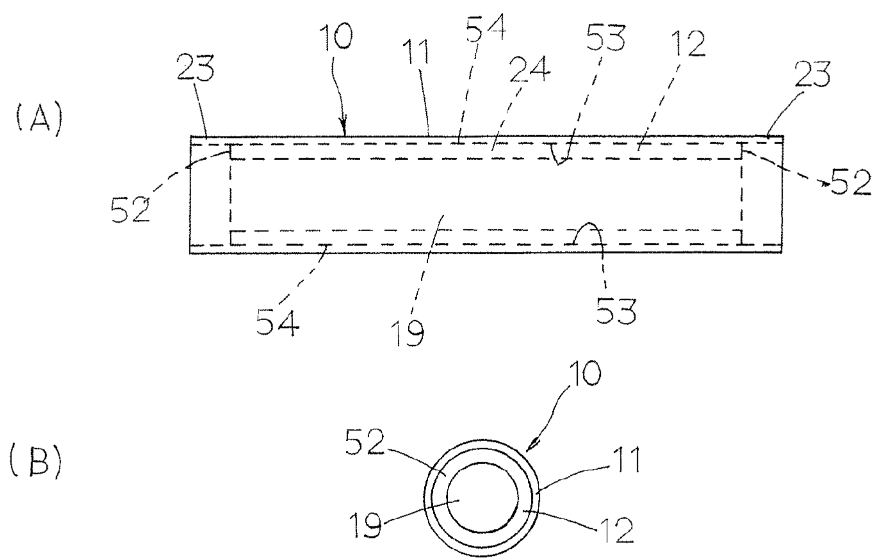

The tubular member 10 used in the version discussed here, especially shown in FIG. 5, is composed of an outer cylinder 11 and an inner cylinder 12 placed inside the outer cylinder 11. The outer cylinder 11 is made of a material having properties of high strength and corrosion proof selected from stainless steel, for example austenite stainless steel SUS304, aluminum alloy, non-magnetic ceramics, high strength resinous material and composite reinforced with carbon fibers. The inner cylinder 12 inside the outer cylinder 11 is made of a sintered resinous material of porous texture impregnated with lubricant. The outer cylinder 11 having accommodated the inner cylinder 2 therein fits over the spigots 25 at the tube ends 23 thereof in such a relation that circular edges 52 of the inner cylinder 12 come into edge-on abutment against the circular edges 51 of the spigots 25. The inner cylinder 12 has a radial thickness equal with that of the spigots 25 so that the turnaround passages 18 are smoothly connected to the return passage with causing no gap or difference between them. With the linear motion guide unit constructed as stated earlier, moreover, there may be a slight clearance of, for example 0 to 0.1 mm between an inside circular surface 53 of the outer cylinder 11 and an outside circular surface 54 of the inner cylinder 12.

The outer cylinder 11 may be produced from any of materials possessing enhanced stiffness, corrosion resistance and inexpensiveness in cost, ceramics, resins, or resinous composites reinforced with carbon fibers. The inner cylinder 12 is made of sintered resinous materials of continuous-cellular or porous texture cast or molded into a cylindrical shape. The tubular member 10 is assembled by insertion of the inner cylinder 12 inside the outer cylinder 11. Then, after having fit the inside circumference of the outer cylinder 11 over the outer circumference of the spigots 25 on the end caps 4, the tubular member 10 is built in the slider 2. Moreover, the inner cylinder 12 is less in length than the outer cylinder 11 by a distance equivalent to the spigots 25 raised above the end caps 4 mounted on the opposite end surfaces 21 of the carriage 3. The spigots 25 are raised above the end caps 4 across a length of a matter of ½ to 1 the diameter of the ball 20. The bulges 6 of the carriage 3 are undercut to form the concaves 7 semi-circular in transverse section, which is adapted to fit over the tubular member 10 with either making contact with the tubular member 10 or leaving a small clearance away from the tubular member 10.

The concaves 7 in the bulges of the carriage 3 are designed to fit over the tubular members 10 either to come into contact with the outside circular surfaces of the tubular members 10 or away about 0.1-0.2 mm from the outside circular surfaces of the tubular members 10. With the carriage so small in dimension as conforming to the guide rail having the width of for example 12 mm, drawing operation is preferred to make the concaves 7 on the undersides of the bulges 6 of the carriage 3 because the drawing is basically less in formation of wrinkles on their drawn surfaces, therefore resulting in saving cost for subsequent cutting operation. For large or long-type carriages 3, cutting operation on the concaves 7 would be required because the drawing causes large wrinkles on the carriage 3. In addition, large wrinkles or strains developed due to hear treatment of the carriage 3 may be removed simultaneously with cutting operation to finish the raceway grooves 15 into the raceway surfaces.

Figure 6:
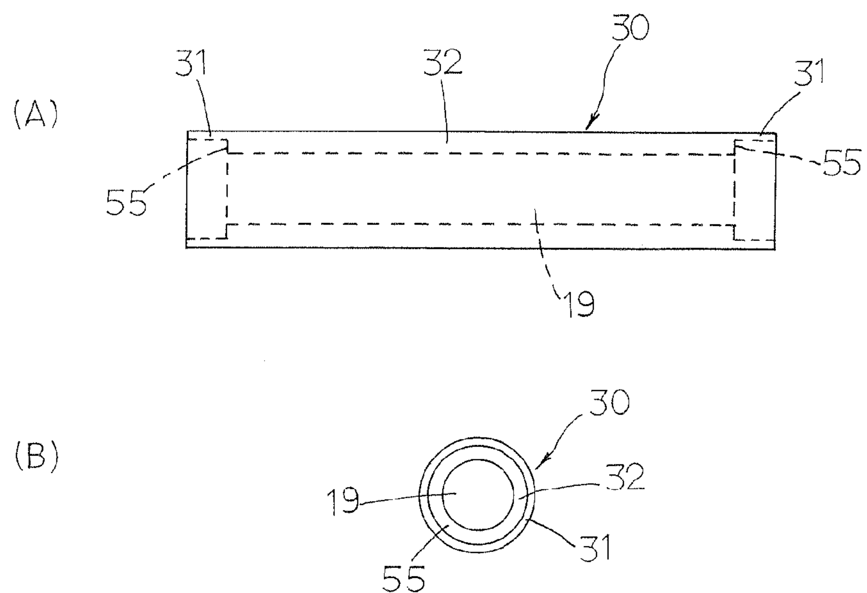

Referring to FIG. 6, there is shown another embodiment or second version of the linear motion guide unit according to the present invention. A tubular member 30 has a one-piece construction made of any one selected from resinous materials such as DURACON (registered trademark) and so on, resinous materials possessing enhanced stiffness reinforced with carbon fibers and metallic materials. Inside diameter at lengthwise opposite ends 31 is made larger than that in the middle 32 of the tubular member 30. Along circular inside boundaries between the ends 31 and the middle 32, there are gaps or stepwise radial differences a height of which is equal with the radial thickness of the spigot 25. Circular inside surfaces of the ends 31 are designed to have the inside diameter which allows the ends 31 to fit snugly over the spigots 25 of the end caps 4 with the middle 32 of the tubular member 30 lying in flush with the spigots 25 on their inside diameter so as to connect the turnaround passages 18 with the return passage 19 without causing the gaps or differences between them. The spigots 25 fit into the tubular member 30 in such relation that the circular edges 51 of the spigots 25 come into edge-on abutment against circular edges 55 of the middle 32 in the tubular member 30. As the tubular member 30 of the second version as stated earlier is the one-piece tubular member of resinous materials such as DURACON (registered trademark) or composite materials possessing enhanced stiffness reinforced with carbon fibers, the return passages 19 may be constructed very simple with only the tubular members 30 in case where the lubrication is done at any location other than the return passages 19. It will be understood of course that the tubular member 30 may be made of tubular materials of stainless steel, aluminum alloys, non-magnetic ceramics, and so on. A functional distinction of the second version from the first version resides in that the tubular member 30 is made using no sintered resinous material of porous texture to be impregnated with lubricant. Accordingly, the second version would be preferably adapted for the linear motion guide units in which lubricant is replenished according to the maintenance schedules or in which the return passage isn't major contributor to lubrication or maintenance-free for the lubrication.

Figure 7:
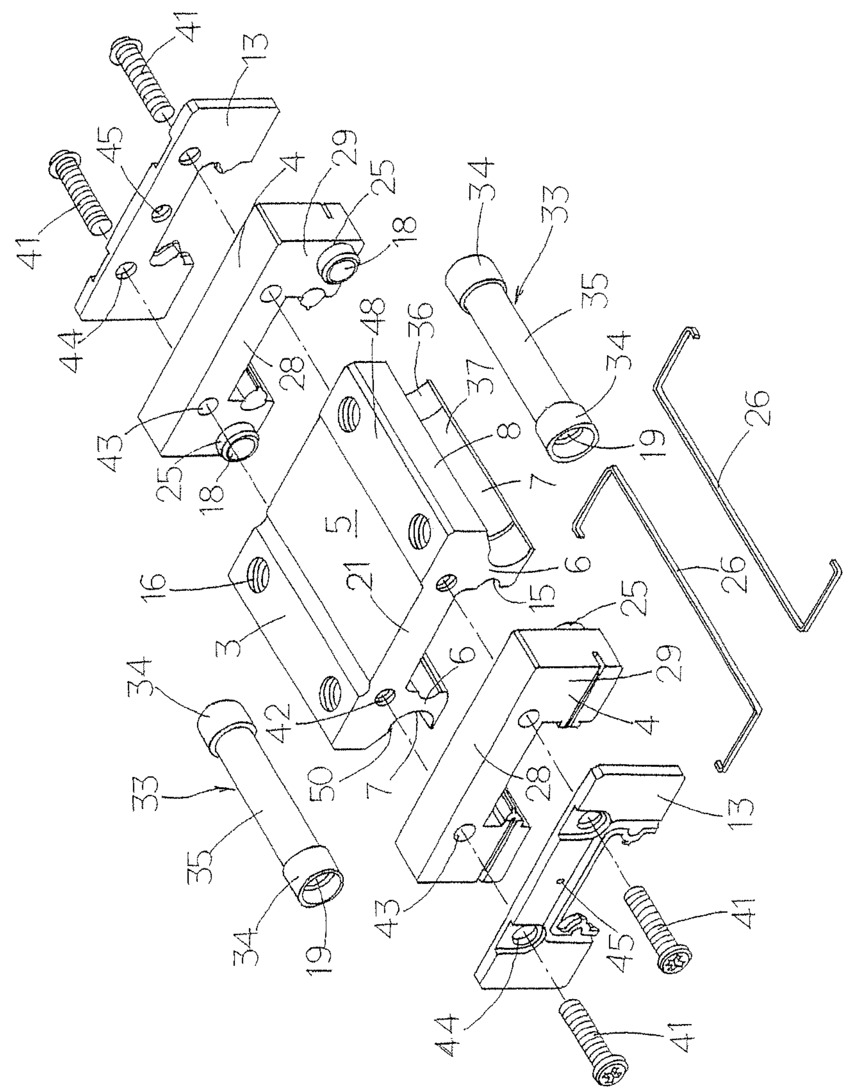
FIG. 7 is an exploded view in perspective to illustrate a third version of a slider according to the present invention.

A further another embodiment or third version of linear motion guide unit of the present invention will be explained later with reference to FIG. 7. The tubular member 33 is radially enlarged at lengthwise opposite ends 34, compared with the middle 35. The ends 34 are designed to fit snugly over the spigots 25 on the end caps 4 while the middle 35 is designed to have an inside diameter identical with that of the spigots 25. The concaves 7 cut in the bulges 6 of the carriage 3 are made deeper at lengthwise ends 35 than at the middle 37 in conformity with the tubular member 30 having the ends 34 and the middle 35. The ends 34 of the tubular member 30 have inside diameters equal with outside diameters of the spigots 25. Because the middle 35 of the tubular member 33 is identical in inside diameter with the spigots 25, the turnaround passages 18 in the spigots 25 are connected to the return passage 19 in the tubular member 30 with no gap or difference between them, thereby making certain of smooth rolling transfer of the balls 20 from one passage to the other passage.

Figure 8:
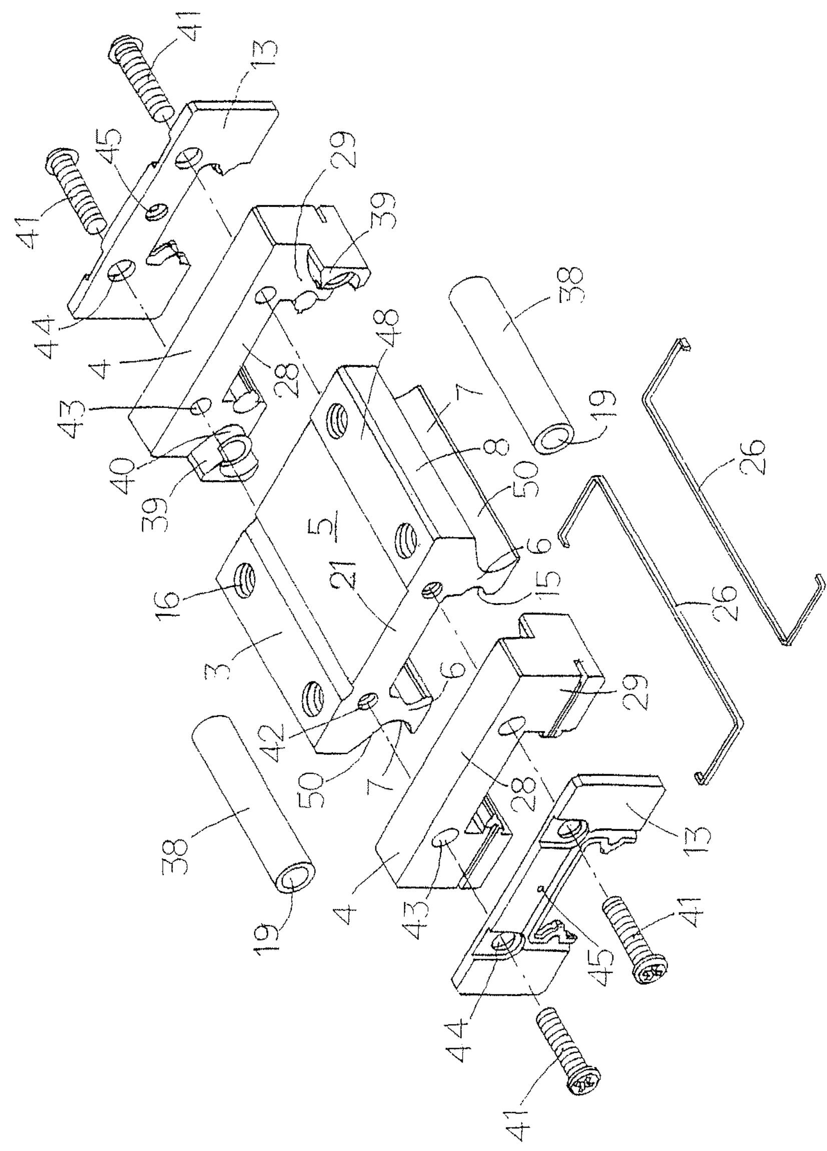
FIG. 8 is an exploded view in perspective to illustrate a fourth version of a slider according to the present invention.
Figure 9:
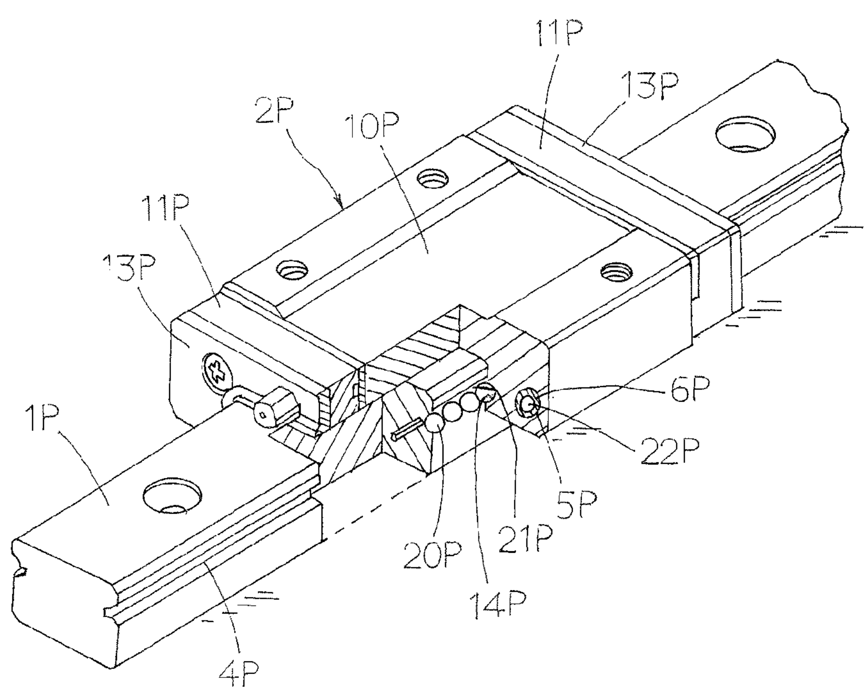
FIG. 9 is a view in perspective, partially broken away, showing a conventional linear motion guide unit.

Referring to FIG. 8, there is shown another embodiment or fourth version of the linear motion guide unit according to the present invention. A tubular member 38 defining the return passage 19 is a cylinder substantially straight from end to end. Correspondingly, the concaves 7 cut in the carriage 3 each have a semi-circular configuration in transverse section extending straight throughout the overall length thereof. On the side bulges 29 of the end caps 4, there are formed prominences 40 raised above the end caps 4 to provide the spigots. Backstays 39 embrace the prominences 40 to keep the tubular member 38 in alignment with the prominences 40. Thus, the tubular member 38 is placed inside the concave 37 in a way that the ends of the tubular member 38 come into edge-on abutment against the prominences 40 serving as the spigots. With the fourth version constructed as stated earlier, the tubular member 38 for the return passage 19 is identical in the inside diameter with the prominences 40 for the spigots on the end caps 4 so that the turnaround passages 18 and the return passage 19 are connected with each other with no gap or difference between them, thereby making certain of smooth rolling transfer of the balls 20 from one passage to the other passage.

What is claimed is:

1. A linear motion guide unit, comprising:

an elongated guide rail having only a first raceway groove extending lengthwise on each side of the guide rail;

a slider that fits over or conforms to the elongated guide rail for movement in a sliding manner relative to the guide rail, and balls rolling through closed or looped circuits, each of said circuits composed of a load-carrying raceway defined between one of the first raceway grooves and a corresponding second raceway groove, a return passage extending in the slider direction in parallel with the load-carrying raceway and turnaround passages connecting the load-carrying passage with the return passage;

wherein the slider includes a carriage having a first upper portion and first side bulges, one of said first side bulges lying on each widthwise opposite side of the first upper portion to extend downward alongside of the lengthwise sides of the guide rail, end caps secured on lengthwise opposite ends of the carriage, and a tubular member lying along an outside of each of said first side bulges in a sliding direction to provide the return passages;

wherein the carriage is cut away between the first side bulges to form the raceway grooves and undercut at underparts of the first side bulges to provide concaves extending in the sliding direction;

wherein the tubular members fit into the concaves to bring the return passages inside the tubular members into connection with the turnaround passages in the end caps;

wherein the end caps each have a second upper portion equivalent to the first upper portion of the carriage and second side bulges equivalent to the first side bulges of the carriage, each of the second side bulges of the end caps having a spigot raised above the end caps at areas directly exposed to the concaves on the carriage to extend out of the turnaround passages to fit into tube ends of the tubular members to keep in place the tubular members and connect the turnaround passages with their associated return passages;

wherein the concaves extending in the side bulges of the carriage in the sliding direction each are shaped to have a portion of a circular configuration in transverse section, which is adapted to make a fit over a portion of an outside circular surface of the tubular member;

wherein the return passages inside the tubular members and the turnaround passages inside the spigots are identical with each other in diameter so as to connect the turnaround passages with the return passages;

and wherein the tubular members are placed in the concaves more inwards than lengthwise sides of the carriage.

2. A linear motion guide unit constructed as defined in claim 1, wherein each tubular member is composed of an outer cylinder and an inner cylinder placed inside the outer cylinder, the outer cylinder being of a material selected from stainless steel, aluminum alloy, ceramics, resins and a composite reinforced with carbon fibers, and the inner cylinder being of a sintered resinous material of porous texture impregnated with lubricant.

3. A linear motion guide unit constructed as defined in claim 2, wherein the outer cylinder having accommodated the inner cylinder therein fits over the spigots at the tube ends thereof in such a relation that circular edges of the inner cylinder come into edge-on abutment against the circular edges of the spigots and wherein the inner cylinder has a radial thickness equal with that of the spigots so that the turnaround passages are smoothly connected to the return passage without causing a gap or difference between them.

4. A linear motion guide unit constructed as defined in claim 2, wherein there is a slight clearance between an inside circular surface of the outer cylinder and an outside circular surface of the inner cylinder.

5. A linear motion guide unit constructed as defined in claim 2, wherein there is no clearance between an inside circular surface of the outer cylinder and an outside circular surface of the inner cylinder.

6. A linear motion guide unit constructed as defined in claim 1, wherein each tubular member has a one-piece construction of a material selected from resins, resinous materials possessing enhanced stiffness reinforced with carbon fibers and metallic materials.

7. A linear motion guide unit constructed as defined in claim 1, wherein each tubular member at the tube ends thereof is larger than at a major middle of the tubular member in inside diameter to fit at the tube ends over the spigots and wherein the tubular member at the major middle is equal with the spigots in the inside diameter so as to connect the turnaround passages with the return passage without causing gaps or differences between the passages.

* * * * *